(12) United States Patent
Stone et al.

(10) Patent No.: US 11,640,447 B1
(45) Date of Patent: May 2, 2023

(54) META-MODEL CLASSIFIER

(71) Applicant: Meta Platforms, Inc., Menlo Park, CA (US)

(72) Inventors: Matthew David Stone, Danville, CA (US); Andrew Donald Yates, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1303 days.

(21) Appl. No.: 15/956,564

(22) Filed: Apr. 18, 2018

(51) Int. Cl.
*H04L 67/50* (2022.01)
*G06K 9/62* (2022.01)
*G06F 16/907* (2019.01)
*H04L 67/53* (2022.01)

(52) U.S. Cl.
CPC ......... *G06K 9/6267* (2013.01); *G06F 16/907* (2019.01); *G06K 9/623* (2013.01); *G06K 9/6257* (2013.01); *H04L 67/53* (2022.05); *H04L 67/535* (2022.05)

(58) Field of Classification Search
CPC .... G06K 9/6267; G06K 9/623; G06K 9/6257; G06F 16/907; H04L 67/20; H04L 67/22
See application file for complete search history.

(56) References Cited

U.S. PATENT DOCUMENTS

| | | | |
|---|---|---|---|
| 10,209,974 B1 * | 2/2019 | Patton | G06F 8/60 |
| 2017/0206457 A1 * | 7/2017 | Roychowdhury | G06Q 30/02 |
| 2019/0034963 A1 * | 1/2019 | George | G06Q 30/0246 |
| 2019/0303995 A1 * | 10/2019 | Li | G06Q 30/0253 |
| 2019/0311229 A1 * | 10/2019 | Qian | G06K 9/6259 |

\* cited by examiner

*Primary Examiner* — Michael A Keller
(74) *Attorney, Agent, or Firm* — Fenwick & West LLP

(57) ABSTRACT

An online system accesses a model attribute store, which stores configuration information and model performance scores for a plurality of models, each model used to predict performance metrics regarding content from a third party system presented to users of the online system. The online system trains a meta-model classifier using the models in the model attribute store, the meta-model classifier trained to predict, for a candidate model, a predicted model performance score of that candidate model. The online system also generates a plurality of candidate models for input to the meta-model classifier, each of the plurality of candidate models including a distinct set of configuration information. The predicted model performance scores for a selected candidate model in the plurality of candidate models is computed using the meta-model classifier, and the online system transmits a report to the third party system indicating predicted model performance score for the selected candidate model.

20 Claims, 3 Drawing Sheets

META-MODEL CLASSIFIER

BACKGROUND

This disclosure relates generally to large scale online systems having a large number of users, and specifically to a meta-model classifier to automatically predict the accuracy of multiple models that determine performance metrics of users in the online system.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, these online systems provide an ideal forum for entities to increase awareness about products or services by presenting content to online system users.

In these online systems, some content items are provided by third party systems for distribution to users of the online system. These may be distributed based on a variety of factors and inputs processed by the online system via a means of predicting the content that may result in the highest performance metrics for the content when it is presented to users (e.g., the performance metric may be to measure a particular user action). However, as the complexity and number of inputs and features grow, additional models may need to be introduced in order to more accurately predict the performance of users and other components in the online system. However, with the increase in the number of models used, a need arises to be able to automatically determine which of the models delivers the most accurate results without having to test each model in a live environment.

SUMMARY

Embodiments include an online system that accesses a model attribute store, the model attribute store identifying configuration information and model performance scores for a plurality of models, each model used to predict performance metrics regarding content from a third party system presented to users of the online system. The online system trains a meta-model classifier using the plurality of models in the model attribute store, the meta-model classifier trained to predict, for a candidate model, a predicted model performance score of that candidate model. The online system also generates a plurality of candidate models for input to the meta-model classifier, each of the plurality of candidate models including a distinct set of configuration information. The predicted model performance scores for a selected candidate model in the plurality of candidate models is computed using the meta-model classifier, and the online system transmits a report to the third party system indicating predicted model performance score for the selected candidate model.

Such a system has many advantages. Live data does not need to be used to test new models. If testing were performed in the production environment, the limited resource of live data would be consumed by the model, and the predictive accuracy of the model may not be sufficiently accurate. A human would also not be needed to make the prediction of the quality of a model. A human judge may have inherent biases and may not accurately gauge whether a candidate model performs well due to an inability to be able to comprehend and consider all features and functions in the model, as each candidate model may have hundreds or thousands of features.

BRIEF DESCRIPTION OF THE DRAWINGS

Figure (FIG. 1 is a high level block diagram of a system environment for an online system, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
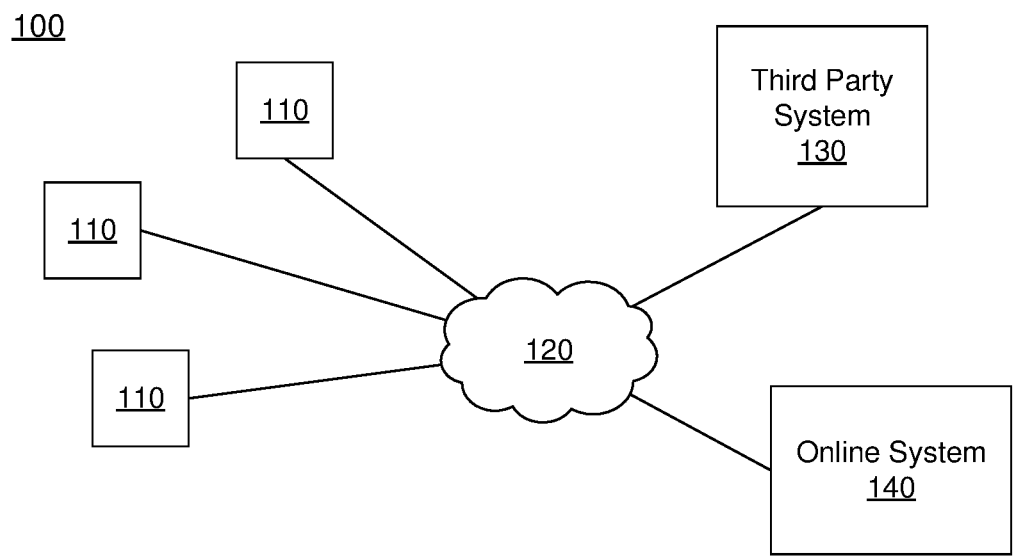

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates content to the online system 140 for display to users of the client devices 110. The content may be created by the entity that owns the third party system 130. Such an entity may be an advertiser or a company producing a product or service that the company wishes to promote. In another embodiment, the third party system 130 is able to access a user interface of the online system 140 that allows the third party system 130 to view, for different content distribution opportunities, one or more primary factors indicating the reasons for which the content was distributed to certain users, as determined by the online system 140. Additional details regarding this functionality are described below.

Figure 2:
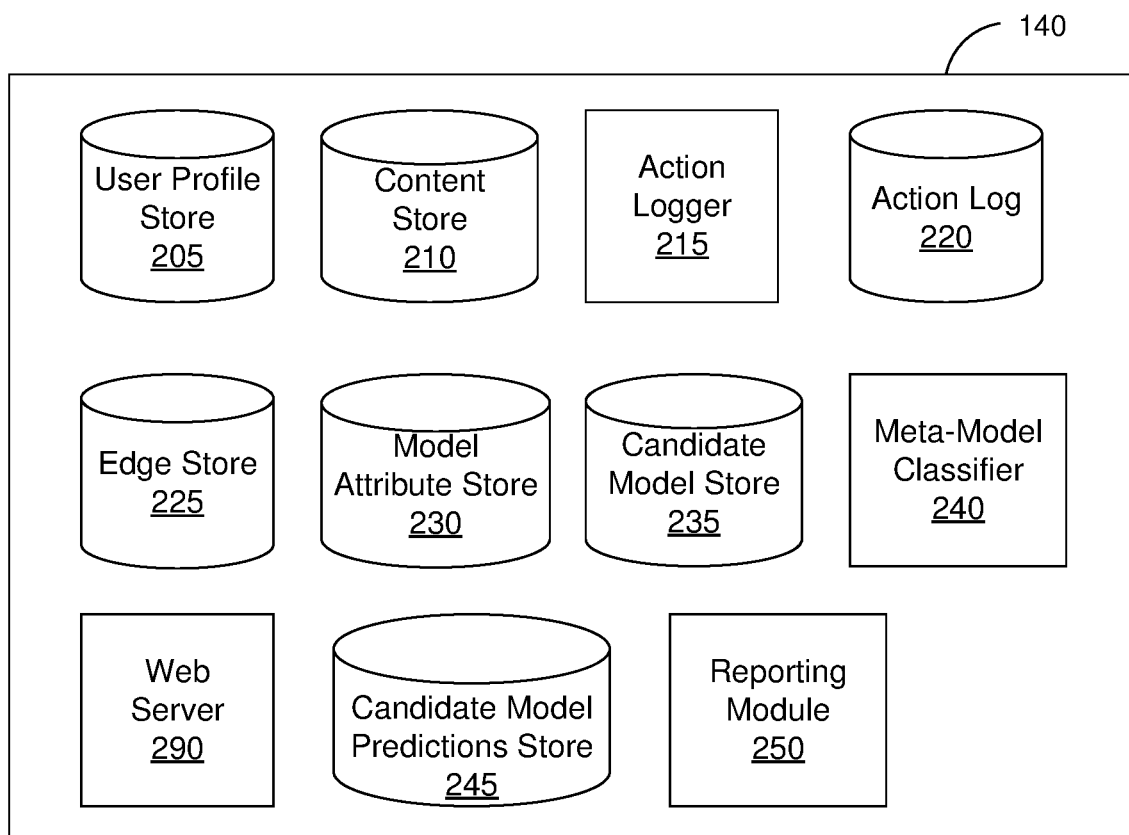
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a model attribute store 230, a meta-model classifier 235, candidate models 240, a candidate model predictions list 245, a reporting module 250, and a web server 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

In one embodiment, the content store 210 may also include content items received from third party systems 130. These content items (e.g., video, audio, text, interactive content, etc.) may be associated with various metadata as selected by the third party system 130. This metadata may include tags describing the content item, features and/or features describing users for which the third party system 130 would like the content items to be distributed to, and in some cases, an indication of a compensation amount to be transmitted to the online system 140 for the opportunity to present the content item to a user of the online system. The features and/or features may describe various profile information of the user, as stored in the user profile store 205 (described above) and/or may describe actions performed by users within and external to the online system 140, as described in the action logger 215 and action log 220 (described below). If a user's profile information or performed actions match these features and/or features, that user may be selected for distribution of the content item. In one case, as described in further detail below, the third party system 130 may also identify a group of seed users and indicates to the online system 140 to distribute the content item to additional users of the online system 140 that are determined by the online system 140 to be similar to the seed users.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing features of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

Model Attribute Store

The model attribute store 230 includes model feature data, configuration data, and model output performance for use in training the meta-model classifier 235. The meta-model classifier 235 can then be used to predict the performance of candidate models.

The candidate models are used to make predictions of performance metrics regarding the presentation of content to users of the online system 140 and/or other activities occurring on the online system 140.

The performance metrics predicted by the online system 140 may relate to various predicted measurements made during the process of determining whether to present a content item from a third party system 130 to a user. For example, these performance metrics may indicate a likelihood of user response to the content item, a similarity of the user to a group of seed users, the value of the user to the third party system 130 (i.e., what kind of benefit, such as return on investment, could the user bring to the third party system 130), how long the user may spend interacting with the third party system 130, how fast a user may respond to the presented content item, what kind of device the user is most likely to use, and so on. The online system 140 utilizes models to predict each performance metric.

If a performance metric(s) (e.g., similarity to seed users) for a user exceeds a certain threshold, the online system 140 may determine that the associated content item should be selected as a candidate for presentation to the user. The online system 140 utilize additional models to predict further performance metrics (e.g., value to the third party system) for the candidate content item and other candidate content items from other third party systems 130, with the candidate content item having the highest (e.g., largest value) predicted performance ultimately presented to the user.

To determine these performance metrics, each model used by the online system 140 receives one or more features as input. Furthermore, each model includes various other configuration parameters.

Examples of these features may include demographic information of users, geographic information of users (e.g., zip code), a user's browsing history, actions performed by users in the online system 140 (e.g., liking, posting comments, uploading content, etc.), a user's connections in the online system 140, a user's content consumption history, a user's browsing history including time spent by the user, internal metrics (e.g., data usage, device type usage, etc.), parameters of the online system 140, system variables, temporal data, sparse data, data from the third party system 130, data from users, other data from the online system 140 (e.g., from the user profile store 205, content store 210, action log 220, and edge store 225), and so on.

Examples of other configuration parameters may include which algorithm is being used for the model (e.g., a convolutional neural network, random forest, gradient boost decision tree (GBDT), regression models, etc.), algorithm specific parameters (e.g., number of trees and learning rate for GBDT), predictive capability and/or accuracy of model, metadata for input features and output data, historical input and outputs, etc.

Using training data that has the selected (desired) input features for the model as well as paired output labels (which are known ground truth outputs for the paired input features), each model may be trained by the online system 140 to make predictions regarding the performance metrics. The training data may include historical data. After being trained, the model generates importance scores for one or more of the input features. The importance scores indicate an impact of each feature in influencing the predicted performance metric that is made the model. They may be derived by the online system 140 based on some internal variable of the type of model that is used and trained. For example, the importance score may be the single weight value for each feature if the model is a logistic regression model. As another example, for a neural network, the importance score for a feature may be the combined sum of the weights given to a particular feature across all the nodes that consider the feature in the neural network.

For each of the one or more models in the online system 140, the features that are used for the model, the additional configuration parameters, and the feature importance scores, are stored within the model attribute store 230. The models of the online system 140 for which this data is stored in the model attribute store 230 may be referred to as a training set of models.

In addition, the model attribute store 230 stores a model performance score of each of the training set of models. The model performance score represents how well the model performs and how much value it brings to the online system 140 and/or the third party system 130, depending on what the model is predicting.

In one embodiment, the model performance score may indicate a relative increase in value provided by the model to the online system 140 and/or the third party system 130 compared to the baseline. This baseline may indicate the value of the current model used to predict the same performance metric. The value provided to the online system 140 or the third party system 130 indicates a benefit provided to the online system 140 or third party system 130, and may be one of many measurements of selected data in the online system 140, third party system 130, or elsewhere. Examples of such measurements include return on investment, user engagement, time spent by a user, a count of a specific type of action by the user, measurements based on offline data (e.g., user actions at physical locations in the real-world), and so on. The model performance score may be computed directly from one of these measurements, such that it represents a difference between the measurement prior to the implementation of the model (the baseline) and subsequent to the implementation of the model, while controlling for other variables. To control for other variables, the model performance score may be computed based on measurements where only the model can have impacted any change in the results of the measurements.

Alternatively, the model performance score may be determined based on an interpretation of the change in the measurement. For example, the model performance score may be a binary value (e.g., "good" or "bad") such that if the measurement is below a predefined threshold (e.g., the prior baseline value), the model performance score for the corresponding model may be set to zero, and if the measurement exceeds the threshold, the model performance score may be set to one. In both these cases, the measurement made of the data should be a measurement that would be impacted due to the online system 140 making certain decisions based on the predictions of the model. The measurements may be an average, median, maximum measurement, minimum measurement, or other statistical analysis of the selected data.

In another embodiment, the model performance score may indicate the accuracy of the prediction of the performance metric made by the model in comparison to the actual measured performance metric. As noted above, each model attempts to predict some performance metric. However, this prediction may have varying degrees of accuracy compared to a measurement of the actual performance metric at a later time. For example, a model may predict that a user will spend 20 minutes at a website of a third party system 130, when in actuality the user spent only 10 minutes. For many models, this difference in the predicted performance metric made by the model and the actual performance metric can be measured. These differences may be averaged over a period of time (or some other statistical analysis may be applied) in order to compute the model performance score for the particular model.

In the model attribute store 230, each set of features used, configuration parameters, and model performance scores for a training model may be associated with one or more of these model performance scores. Each training model may have at least one model performance score stored in the model attribute store 230 which may be related to the same type of measurement across all the training models. However, one or more of the training models may be associated with more than one model performance score, each based on a different measurement, with each model performance score stored in the model attribute store 230 for the corresponding training model and its other data. The various model performance scores, feature importance scores, and other numerical values in the model attribute store 230 may be normalized.

To further illustrate the data used in the model attribute store 230, one example of a training model is described below, along with its creation and how its data could be stored in the model attribute store 230.

In this example, the model determines a performance metric that measures the similarity between a user of the online system and set of seed users identified by the third party system 130. These seed users represent the types of users to whom the third party system 130 wants to present content items.

After matching the seed users identified by the third party system 130 to the same users within the online system, the online system 140 identifies features shared by the seed users based on data the online system 140 has for these seed users. These particular features include data that describes some information related to the seed user, such as actions performed by the seed users in the online system 140 (e.g., posts, comments, shared content), as well as custom data provided by the third party system 130.

To generate the training data for the model, the online system 140 accesses historical data to find users with the same features as those identified for the seed users. Among these users, the online system 140 determines a value of that user to the third party system 130. This value is used as a basis for the output labels for the training data for this model. The similarity of a user to the seed users is assumed to be higher when the value for that user is higher. This value data may be received from the third party system 130, or computed based on actions made by the selected user in the historical data (e.g., each action made by the user against the third party system 130 is given a score, and the value is the cumulative score for a past number of days)

Using this input training set and the output labels, the model is trained. After training, the model has accumulated various importance scores for the input features of the model, as some features may have a higher impact or weight in the model in predicting the value. These importance score values may be an internal weighting used by the model, e.g., a weight in a logistic regression model.

Subsequently, the model may be used to predict the value (or similarity) of a user of the online system 140 in relation to the seed users identified by the third party system 130. For this model, the input features (being those features that are shared by the seed users), configuration parameters for the model, the historical accuracy of the model in predicting user value (i.e., predicted vs real value), and feature importance scores may be stored in the model attribute store 230, to be used as training data for the meta-model classifier. Furthermore, over time, the online system 140 determines the model performance score for this model. For example, the online system 140 may determine an increase in user engagement with the third party system 130 based on decisions made due to this model, or may determine the difference between the predicted value of a user by the model and the subsequent actual value provided by the user. These values may be stored as model performance scores for this model in the model attribute store 230.

Candidate Model Store

The candidate model store 235 stores models that may be used in a production environment in the online system 140 based on the results of their predicted performance as determined by the meta-model classifier 240.

Each candidate model may either already have been trained with training data or may only comprise a set of configuration parameters and selected input features without having been trained.

A candidate model that has already been trained is one that also includes the importance scores for each input feature which has been learned by the trained candidate model. A candidate model that has not been trained either has default feature importance scores or no feature importance scores.

As noted above, models are used to predict different performance metrics. The same applies to the candidate models, which may each predict a performance metric. More than one candidate model may be configured to predict the performance metric, but this may not always be the case (i.e., each candidate model is configured or trained to predict a separate performance metric).

In one embodiment, the candidate models are generated by the online system 140 to have a variety of distinct configuration options and features. The combination of features to use and associated configuration options may be selected by the online system 140 based on a set of rules. These may indicate which types of features and/or configuration parameters should be group together as input features for predicting a desired performance metric. The rules may indicate what configuration parameters should be used for certain input features.

Instead of or in addition to rules, the online system 140 may generate the configuration parameters and features based on variations of existing models in the model attribute store 230. The online system 140 may take an existing set of configuration parameters from one training model and pair these with another set of input features of another training model to generate the configuration parameters and input features of a new candidate model. The training models selected for this paring may both predict the same performance metric. The online system 140 may derive configuration parameters and input features from more than just two training models. The online system 140 may also take a training model's configuration parameters and features and modify one or more of the configuration parameters and/or features and/or add one or more configuration parameters and features. This may slightly adjust ("mutate") an existing training model to generate the new candidate model. The selection of the training models for use in this pairing and mutation process may be random.

Meta-Model Classifier

The meta-model classifier 240 is trained to predict the model performance of new candidate models based on the input features and configuration parameters for the candidate models. Each candidate model may take a different combination of input features, configuration parameters, and may be configured or designed to predict a different performance metric.

The meta-model classifier 240 is trained based on the training data from the model attribute store 230. The training data includes sets of input data and paired output labels (i.e., ground truth). As noted above, the input data may include model configuration data as well as input features and/or feature importance scores for each training model, with the output labels including the model performance scores for the same training model. As noted above, this training data may be gathered from prior historical data.

As the training models may differ in both the number of input features and configuration options as well as the type of input features and configuration options, the training data may not be uniform. In this case, when used as input training data for the meta-model classifier 240, those input data that have a value may thus be set to their actual value, or to an "on" value (e.g., "1"), while those input data that do not exist (i.e., do not have a value) may be set to zero or null. For example, a training model I may have 3 input features of type A, B, and C, while a training model II may have only 2 input features of type E and F. When training model I is used as input training data for meta-model classifier 240, the entire set of features for the input training data set for training model A may be {1, 1, 1, 0, 0}, indicating that training model I uses features A, B, C, but not E and F. Similarly, the input training set for training model II would be {0, 0, 0, 1, 1}. Note that instead of 1 and 0, the input set values may be set to the actual values of the input features as well. The configuration options, feature importance scores, and other values used as training data would be arranged in a similar fashion when used as training data for the meta-model classifier 240.

Once the meta-model classifier 240 is trained using the training data in the model attribute store 230, it may be tested against a verification data set, and is subsequently used to generate predicted model performance scores for new candidate models, which may be stored in the candidate model store 240. Note that the meta-model classifier 240 is generating predicted model performance scores, and not predicted performance metrics (which would instead be predicted by the models themselves).

As noted, the candidate models may already be trained, but have not been used in a production environment to make predictions regarding associated performance metrics that impact the operations of the online system 140. In such a case, the meta-model classifier 240 may be used to first predict the expected model performance of the candidate model. If the predicted performance falls below a threshold, then the candidate model may not be implemented in the actual production environment. The threshold may be a relative threshold (e.g., a percentage) compared to the other candidate models or the models used in production, or may be a fixed value. By using the meta-model classifier 240, the model performance can be quickly estimated for a large number of different candidate models using a large amount of data learned by the meta-model classifier 240, rather than having a human attempt to guess whether a new candidate model would perform well.

While the meta-model classifier 240 is trained on many different types of input features and configuration options, just like with the case of the training models, not all the candidate models may have all these input features or configuration options. When applying the meta-model classifier 240 to a candidate model that does not have all of the input features and configuration options for which the meta-model classifier 240 was trained on, those input features of the candidate model that are not present may be given a default value, a zero value, or a null value. This allows the meta-model classifier 240 to be applied to candidate models having different sets of inputs. As the meta-model classifier 240 was also trained using training models having different sets of input features (as described above), the meta-model classifier 240 can still derive a predicted performance score for these candidate models, so long as the input features for the candidate models were used in some combination or form when used to train the meta-model classifier.

Furthermore, in some instances, the candidate models themselves may not have been trained. Hence, they may not have computed feature importance scores. In such a case, the feature importance scores may also be set to default values when the meta-model classifier 240 is applied to these particular candidate models. These default scores may be based on or copied from the feature importance scores of similar or identical input features retrieved from the model attribute store 230 for training models that predict similar or identical performance metrics.

After applying the meta-model classifier 240 to one or more of the candidate models, the meta-model classifier 240 generates predicted model performance scores for each candidate model for which the meta-model classifier 240 is applied. Each predicted model performance score indicates a prediction of the model performance score for each candidate model. As in the measured model performance scores for the training models, the predicted model performance score may indicate an increase (or decrease) in value or other measurement from a baseline, or an accuracy level of the prediction of the performance metric that would be made by the candidate model. The predicted model performance scores made by the meta-model classifier 240 may be normalized against each other. The predicted model performance scores are stored in the candidate model predictions store 245.

Candidate Model Predictions Store

The candidate model predictions store 245 stores predicted model performance scores for the corresponding candidate models in the candidate model store 235, as predicted by the meta-model classifier 240. In one embodiment, the meta-model classifier 240 is updated with new training data on a periodic basis, and generates new predicted model performance scores for each candidate model after receiving the new training data. Each of the sets of one or more predicted model performance scores includes a link or identifier to the candidate model in the candidate model store 235 to which the set of scores belongs. In one embodiment, the predicted model performance scores are stored with the candidate models in the candidate model store 235.

Reporting Module

The reporting module 250 transmits reports of the results of the predicted model performance scores to the third party system 130 or for review in the online system 140. The reporting module 250 may produce reports for the third party system 130 or for an internal process within the online system 140.

For the third party system 130, the reporting module 250 may indicate the predicted performance score for a candidate model provided by the third party system 130. The reporting module 250 may also report the performance scores of models already in use in the online system 140 and which are provided by the third party system 140, and which predict the same performance metric. The reporting module 250 may also report the performance scores of other candidate models provided by the third party system 130. This allows the third party system 130 to compare predicted or actual model performance scores between different candidate models and/or in-use models to determine which models provided by the third party system 130 have the best performance scores. The third party system 130 may swap out a model that is being used in production with this best performing model.

The reporting module 250 may also determine, among different candidate models that are predicting the same performance metric, which features provide the best (highest) predicted performance scores when used as input features in a candidate model to predict a specific performance metric. This can be achieved when the meta-model classifier 240 is applied to these different candidate models which predict the same performance metric but have different input features. Specifically, there may be a baseline model already in use by the online system 140 and already having a known model performance score. Additional candidate models may be created that have the same input features as this baseline model but where each candidate model has one or more additional candidate input features. The predicted performance scores for each of these candidate models can indicate the impact of each feature in the prediction of the performance metric. Thus, a higher predicted performance score for a candidate model relative to other candidate models may indicate that the additional candidate input features for that candidate model are useful for predicting the performance metric. Using this method, a set of input features which have the highest impact on the performance metric may be determined and reported by the reporting module 250. This may in turn be used as input into another module of the online system 140 which may use this set of input features as the input features for a new candidate model configured to predict the selected performance metric.

Exemplary Advantages

The system described above provides many advantages. On particular advantage is the ability to automatically and without bias gauge the performance of a candidate model used in the online system 140 prior to that candidate model being used in a production environment. If testing were performed in the production environment, the limited resource of live data would be consumed by the model, and the predictive accuracy of the model may not be sufficiently accurate. Furthermore, the performance measured using the live data would always be historical, and such historical measurements may not always be accurate. Additionally, the sample size of live data used to gauge the performance of the model may be insufficient, however, the more live data is used, the higher the cost of testing the model.

The system described above also obviates the need for a human to predict whether a model is good or bad. A human judge may have inherent biases and may not accurately gauge whether a candidate model performs well due to an inability to be able to comprehend and consider all features and functions in the model, as each candidate model may have hundreds or thousands of features.

Thus, the system described above at least has the advantages of being able to predict performance rather than relying on historical data, not needing a candidate model to be used in production, not having to rely on a small data set, not overfitting, and not using a human.

Data Flow Diagram Illustrating Meta-Model Classifier

Figure 3:
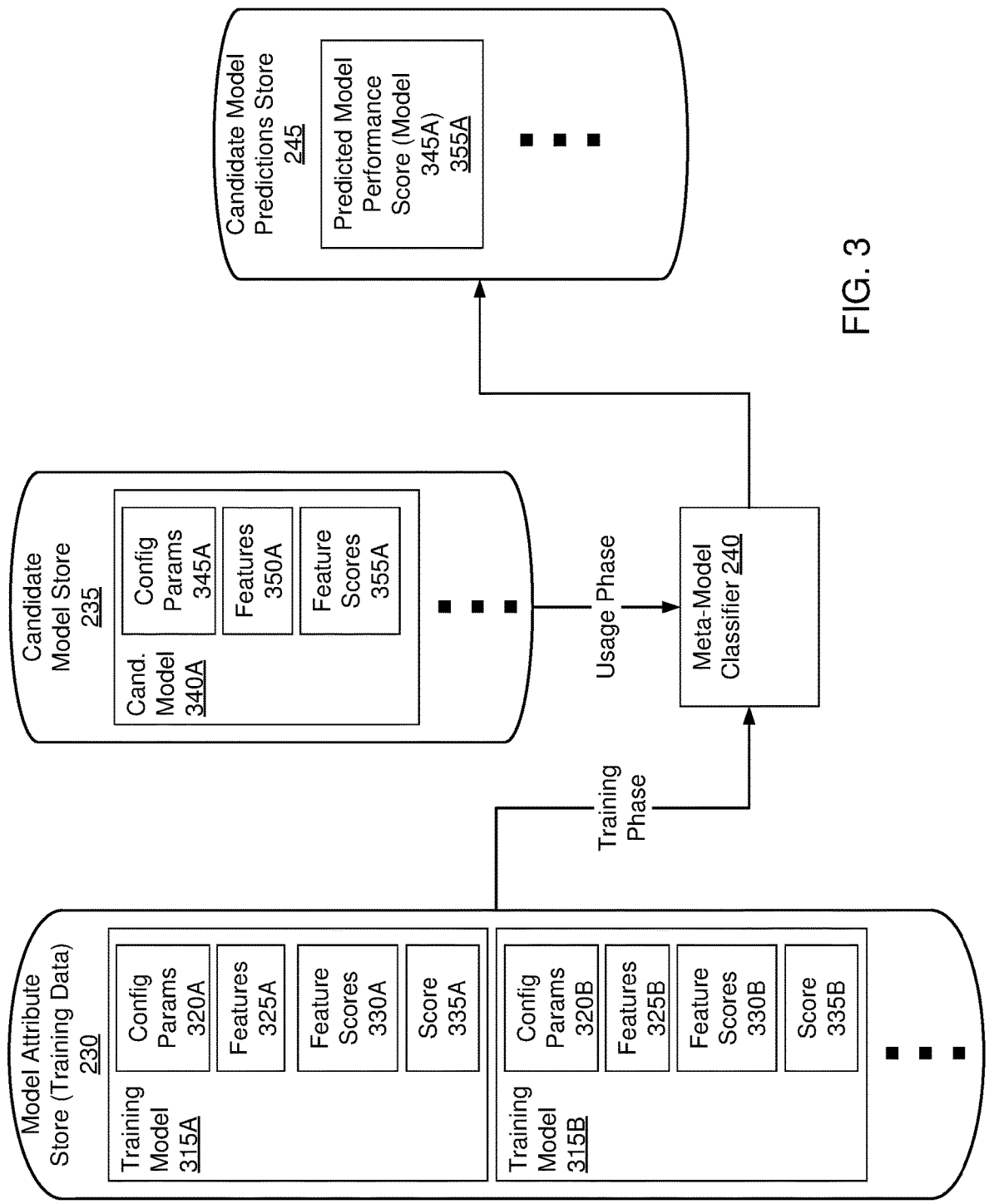
FIG. 3 is a combined data structure and data flow diagram illustrating the training and application of the meta-model classifier, according to an embodiment.

FIG. 3 is a combined data structure and data flow diagram illustrating the training and application of the meta-model classifier, according to an embodiment. In other embodiments, the process may include different and/or additional steps than those described in conjunction with FIG. 3. Additionally, in some embodiments, the process may be performed in a different order than the one described in conjunction with FIG. 3.

Initially, the online system 140 trains the meta-model classifier 240 in a training phase using data from the model attribute store 230. As previously noted, the model attribute store 230 includes configuration parameters, features, feature importance scores, and model performance scores for training models which can be used to train the meta-model classifier 240. Here, the model attribute store 230 includes at least the configuration parameters 320A-B, features 325A-B, feature importance scores 330A-B, and model performance scores 335A-B for the training models 315A-B. The configuration parameters 320A-B may include the model type, metadata, model parameters, and so on, for each training model 315A-B, as described above. Although only three models are shown here, in practice the model attribute store 230 includes more training models (e.g., 100s to 1000s).

The meta-model classifier 240 is trained using the training models in the model attribute store 230, according to the methods described above. The input features into the meta-model classifier 240 are the configuration parameters 320, features 325, and feature importance scores 330. The output labels for the meta-model classifier 240 are the model performance scores 335. After training, the meta-model classifier 240 predicts a model performance score for a candidate model in the candidate model store 235, such as candidate model 340A, based on the configuration parameters 345A, features 350A, and feature importance scores 355 for the candidate model 340A.

After computing the predicted model performance score for the candidate model 340A, the prediction is stored in the candidate model predictions store 245. In the illustrated flow, the predicted performance for the candidate model 340A is stored as predicted model performance score 355A. As noted previously, the model performance score may indicate a difference from a baseline, a binary value, a comparison with other candidate models, and so on.

The predicted model performance scores may then be reported to the third party system 130 or used internally in the online system 140 to determine the viability of the candidate model. For example, the prediction may be used to determine whether to make the model live and have it act on live data to make predictions.

Exemplary Flow

Figure 4:
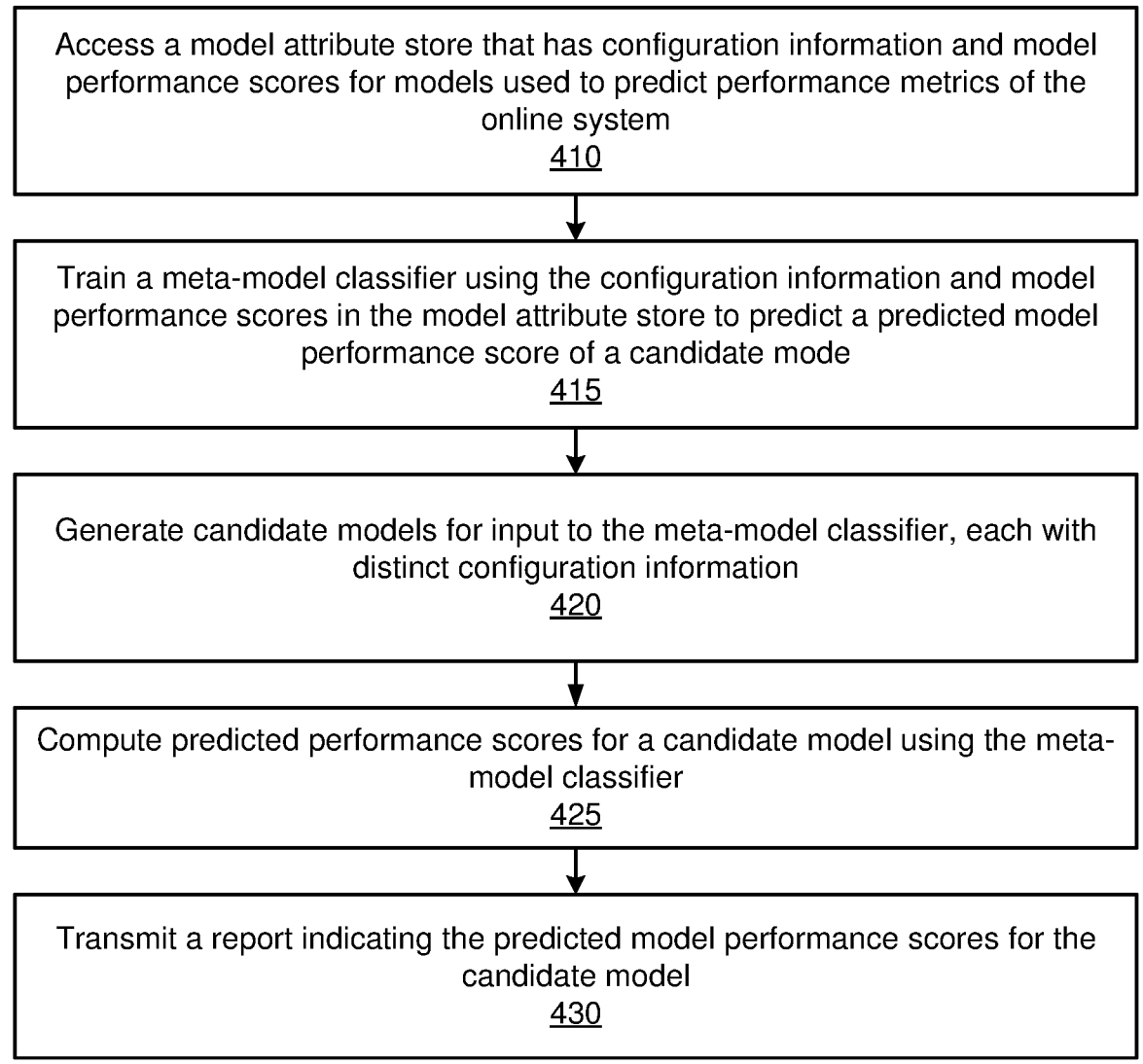
FIG. 4 is a flowchart of one embodiment of a method in an online system for a meta-model classifier, according to an embodiment.

FIG. 4 is a flowchart of one embodiment of a method in an online system for a meta-model classifier, according to an embodiment. In other embodiments, the process may include different and/or additional steps than those described in conjunction with FIG. 4. Additionally, in some embodiments, the process may be performed in a different order than the one described in conjunction with FIG. 4.

Initially, the online system 140 accesses 410 a model attribute store. The model attribute store identifies configuration information and model performance scores for a plurality of models. Each model is used to predict performance metrics regarding content presented to users of the online system.

The online system trains 415 a meta-model classifier using the models in the model attribute store, the meta-model classifier trained to predict for a candidate model, a predicted model performance score of that candidate model.

In some cases, the model attribute store further includes, for each training model, features used by the training model and corresponding feature importance scores. Each feature importance score indicates an impact each corresponding feature has on influencing the predicted performance metric generated by the model. The meta-model classifier is further trained using the features and feature importance scores as input, and each of the generated candidate models includes features used by the candidate model.

The features may include data extracted from a user profile store of the online system. The model performance score may indicate a value of a corresponding model to the third party system, such as measure of time spent by the user at the third party system. The model performance score may instead indicate an accuracy of the predicted performance metric made by a corresponding model compared to a measured performance metric The online system generates 420 candidate models for input to the meta-model classifier, each of the candidate models including a distinct set of configuration information.

In some cases, generating the candidate models includes modifying or adding a configuration parameter of the configuration information of a training model in the model attribute store to generate a mutated configuration information, and generating a new candidate model with the mutated configuration information.

The online system computes 425 a predicted model performance scores for a selected candidate model in the candidate models using the meta-model classifier. This may include extracting a set of input features for the meta-model classifier from the candidate model, where the input features for the meta-model classifier including the configuration information of the candidate model, setting as zero those input features for the meta-model predictor that are not present in the extracted set of input features, and computing the predicted model performance score for the selected candidate model using the extracted set of input features and the zeroed input features.

The online system transmits 430 a report to the third party system indicating predicted model performance score for the selected candidate model. The online system may also remove the candidate model in response to the predicted model performance score of the candidate model falling below a threshold score.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
accessing, by an online system, a model attribute store, the model attribute store identifying configuration information and model performance scores for a plurality of models, each model used to predict performance metrics regarding content from a third party system presented to users of the online system;
accessing a meta-model classifier, the meta-model classifier trained using the plurality of models in the model attribute store to predict for a candidate model a predicted model performance score of that candidate model, wherein the meta-model classifier is separately trained from the plurality of models;
generating a plurality of candidate models for input to the meta-model classifier, each of the plurality of candidate models including a distinct set of configuration information;
computing a predicted model performance score for a selected candidate model in the plurality of candidate models using the meta-model classifier; and
transmitting a report to the third party system indicating predicted model performance score for the selected candidate model.

2. The method of claim 1, wherein the model attribute store further includes, for each training model, features used by the training model and corresponding feature importance scores, each feature importance score indicating an impact each corresponding feature has on influencing the predicted performance metric generated by the model, wherein the meta-model classifier is further trained using the features and feature importance scores as input, and wherein each of the generated candidate models includes features used by the candidate model.

3. The method of claim 2, wherein the features include data extracted from a user profile store of the online system.

4. The method of claim 1, wherein the model performance score indicates a value of a corresponding model to the third party system.

5. The method of claim 4, wherein value is a measure of time spent by the user at the third party system.

6. The method of claim 1, wherein the model performance score indicates an accuracy of the predicted performance metric made by a corresponding model compared to a measured performance metric.

7. The method of claim 1, wherein the computing the predicted model performance score further comprises:
 extracting a set of input features for the meta-model classifier from the candidate model, the input features for the meta-model classifier including the configuration information of the candidate model;
 setting as zero those input features for the meta-model predictor that are not present in the extracted set of input features; and
 computing the predicted model performance score for the selected candidate model using the extracted set of input features and the zeroed input features.

8. The method of claim 1, further comprising:
 removing the candidate model in response to the predicted model performance score of the candidate model falling below a threshold score.

9. The method of claim 1, wherein the generating a plurality of candidate models further comprises:
 modifying a configuration parameter of the configuration information of a training model in the model attribute store to generate a mutated configuration information; and
 generating a new candidate model with the mutated configuration information.

10. The method of claim 1, wherein the generating a plurality of candidate models further comprises:
 adding a configuration parameter of the configuration information of a training model in the model attribute store to generate a new configuration information; and
 generating a new candidate model with the new configuration information.

11. A computer program product comprising a non-transitory computer readable storage medium having instructions encoded thereon that, when executed by a processor, cause the processor to:
 access, by an online system, a model attribute store, the model attribute store identifying configuration information and model performance scores for a plurality of models, each model used to predict performance metrics regarding content from a third party system presented to users of the online system;
 access a meta-model classifier, the meta-model classifier trained using the plurality of models in the model attribute store to predict for a candidate model a predicted model performance score of that candidate model, wherein the meta-model classifier is separately trained from the plurality of models;
 generate a plurality of candidate models for input to the meta-model classifier, each of the plurality of candidate models including a distinct set of configuration information;
 compute a predicted model performance score for a selected candidate model in the plurality of candidate models using the meta-model classifier; and
 transmit a report to the third party system indicating predicted model performance score for the selected candidate model.

12. The computer program product of claim 11, wherein the model attribute store further includes, for each training model, features used by the training model and corresponding feature importance scores, each feature importance score indicating an impact each corresponding feature has on influencing the predicted performance metric generated by the model, wherein the meta-model classifier is further trained using the features and feature importance scores as input, and wherein each of the generated candidate models includes features used by the candidate model.

13. The computer program product of claim 12, wherein the features include data extracted from a user profile store of the online system.

14. The computer program product of claim 11, wherein the model performance score indicates a value of a corresponding model to the third party system.

15. The computer program product of claim 14, wherein value is a measure of time spent by the user at the third party system.

16. The computer program product of claim 11, wherein the model performance score indicates an accuracy of the predicted performance metric made by a corresponding model compared to a measured performance metric.

17. The computer program product of claim 11, wherein the non-transitory computer readable storage medium has further instructions encoded thereon for the computation of the predicted model performance score that, when executed by the processor, cause the processor to:
 extract a set of input features for the meta-model classifier from the candidate model, the input features for the meta-model classifier including the configuration information of the candidate model;
 set as zero those input features for the meta-model predictor that are not present in the extracted set of input features; and
 compute the predicted model performance score for the selected candidate model using the extracted set of input features and the zeroed input features.

18. The computer program product of claim 11, wherein the non-transitory computer readable storage medium has further instructions encoded thereon that, when executed by the processor, cause the processor to:
 remove the candidate model in response to the predicted model performance score of the candidate model falling below a threshold score.

19. The computer program product of claim 11, wherein the non-transitory computer readable storage medium has further instructions encoded thereon for the generation of a plurality of candidate models that, when executed by the processor, cause the processor to:
 modify a configuration parameter of the configuration information of a training model in the model attribute store to generate a mutated configuration information; and
 generate a new candidate model with the mutated configuration information.

20. The computer program product of claim 11, wherein the non-transitory computer readable storage medium has further instructions encoded thereon for the generation of the plurality of candidate models that, when executed by the processor, cause the processor to:
 add a configuration parameter of the configuration information of a training model in the model attribute store to generate a new configuration information; and
 generate a new candidate model with the new configuration information.

* * * * *